United States Patent [19]
Arnold

[11] 4,437,048
[45] Mar. 13, 1984

[54] CONTROL SYSTEM FOR A PULLED LOAD, PARTICULARLY AGRICULTURAL TRACTOR-AND-PLOUGH CONTROL SYSTEM

[75] Inventor: Winfried Arnold, Vaihingen/Enz, Fed. Rep. of Germany

[73] Assignee: Robert Bosch GmbH, Stuttgart, Fed. Rep. of Germany

[21] Appl. No.: 389,587

[22] Filed: Jun. 18, 1982

[30] Foreign Application Priority Data

Jul. 21, 1981 [DE] Fed. Rep. of Germany ....... 3128713

[51] Int. Cl.³ .............................................. G05B 1/06
[52] U.S. Cl. .................................. 318/663; 318/587; 318/590; 318/609; 364/162; 364/424; 172/4
[58] Field of Search ............... 318/663, 590, 591, 587, 318/609, 678; 364/181, 424, 160, 161, 162; 172/4, 5, 6

[56] References Cited

U.S. PATENT DOCUMENTS

| | | | |
|---|---|---|---|
| 3,617,849 | 11/1971 | Charlton | 318/663 |
| 4,064,945 | 12/1977 | Haney | 172/4 |
| 4,120,364 | 10/1978 | Wooldridge | 172/4 |
| 4,191,913 | 3/1980 | Arnold et al. | 318/663 X |
| 4,221,266 | 9/1980 | Fardal | 172/4 |
| 4,276,503 | 6/1981 | Peiffert et al. | 318/663 |

*Primary Examiner*—B. Dobeck
*Attorney, Agent, or Firm*—Frishauf, Holtz, Goodman & Woodward

[57] ABSTRACT

To render the mixing relationship of mixed actual pulling force signals and actual positioning signals independent of the level of the respective individual signals, and thus avoid resetting of a manual positioning command element (7) upon change of respective relationships of pulling force and position, for example depth of furrow of a plough upon change of soil consistency, the force signal is normalized or rendered of equal value with respect to the position signal, preferably in accordance with predetermined events, such as change in the positioning command element, sensing of excessive pulling force, or the like, so that the normalized force signal and the actual position signal will be in balance, and relative change thereof in the mixer will not cause uncontrolled change in the position of the load, for example the plough, without resetting of the command element (or, conversely, require resetting of the command element upon change in relationship of the mixed signals).

23 Claims, 3 Drawing Figures

CONTROL SYSTEM FOR A PULLED LOAD, PARTICULARLY AGRICULTURAL TRACTOR-AND-PLOUGH CONTROL SYSTEM

The present invention relates to a control system which controls pulling effort as well as lifting effort of a pulled load, and more particularly to agricultural machinery, especially to machinery in which the pulled load is adjusted with respect to ground level, for example to control the depth of penetration of a plough being pulled by a tractor, without overloading the tractor.

BACKGROUND

Various types of control systems to control lifting apparatus as well as the pulling effort in agricultural machinery are described in the literature reference "Landtechnik" ("Agricultural Technology", April 1974, page 151 et seq.). In accordance with a principle thereof, a mixed control mode is possible in which transducers applied to the tractor unit sense the pulling force applied by the tractor; additionally, transducers sense the position of the drawn element. Of course, plough-and-tractor combinations may be a single element, in which the pulling force is measured, as well as the penetrating depth, for example the depth of furrows.

The control unit combines the sensed values and controls the pulling force as well as the position of the pulled agricultural implement, for example the plough. The positioning control is used solely to control the position of the pulled element with respect to the tractor element; by mixing the signals, deviations in the desired depth of penetration due to control of the pulling effort can be decreased.

The sensed actual values of implement position and pulling force are determined entirely independently of each other. They should, however, be compared with a single command level which corresponds to a certain mixture of pulling force and position. Accordingly, in a mixed control unit, change of the mixing values results in an undesired change in position of the pulled implement. The reason is, of course, that the actual values derived from the respective transducers have no relationship to each other at all. The operator of a tractor thus had to re-adjust the command of the position each time the mixed force command, that is, the command which both combines and relates position and pulling force is re-adjusted.

THE INVENTION

It is an object to normalize the signal value derived from the force or pulling power transducer with a signal value derived from the position transducer so that the two actual signals are interconnected or interrelated so that the mixing ratio of pulling force and position can be changed without actually changing the position of the implement—in effect only modifying the pulling force.

In the discussion that follows, the invention will be described in connection with a tractor pulling a plough. The invention, of course, is applicable to other combinations, as well as to combined units, in which the pulling force is measured inherently on the pulling power supplying components or portions of a unitary implement.

Briefly, the force or power signal is standardized or normalized at a predetermined time with respect to the position signal; the so normalized or standardized force signal is then supplied to the mixing positioning unit together with the actual force signal.

The system has the advantage that the actual signals which are being processed by the control unit can be related to each other to provide a normalized or standardized relationship, permitting changing of the mixing ratio of the signals without changing of the position of the pulled implement, for example the plough.

The time instances during which the normalization is carried out is preferably dependent on a memory, for example a sample-and-hold circuit, which stores an initial relationship. The relationship is preferably changed, that is, new values are stored if the standardized force signal exceeds, in either direction, certain limiting or threshold values, in other words, falls beyond a range or a window of values. This permits renewal of the standardization upon wide swings of power or force before the control system which controls the positioning of the plough goes beyond its control range. Preferably, a window comparator is used for this purpose which may have a variable range or width in dependence on the position of the plough, since standardization will occur in dependence on the actual position. Thus, the limiting comparison levels, that is, the width or range of the comparison window, can be individually adjusted in accordance with the normalized value. A time delay unit is preferably also used which prevents transfer of excessive values, that is, values falling beyond the limit which may occur only for short periods of time, so that short-time deviations will not affect the overall standardization. For example, if a plough should hit a stone or rock which is pushed aside, the sudden increase in pulling force, which again disappears after the stone has been passed, should not cause a change in position of the plough.

The operator of the tractor is preferably given the opportunity of manual intervention in the automatic positioning system and, for example, should have means to permit storing of a predetermined mixing ratio and normalization in the memory manually under his control. Entry into the memory may be done in dependence on the position of the mixing unit itself, which is a preferred form if the mixing unit itself is subject to feedback and is not self-adjusting or self-balancing.

DRAWINGS

Figure 1:
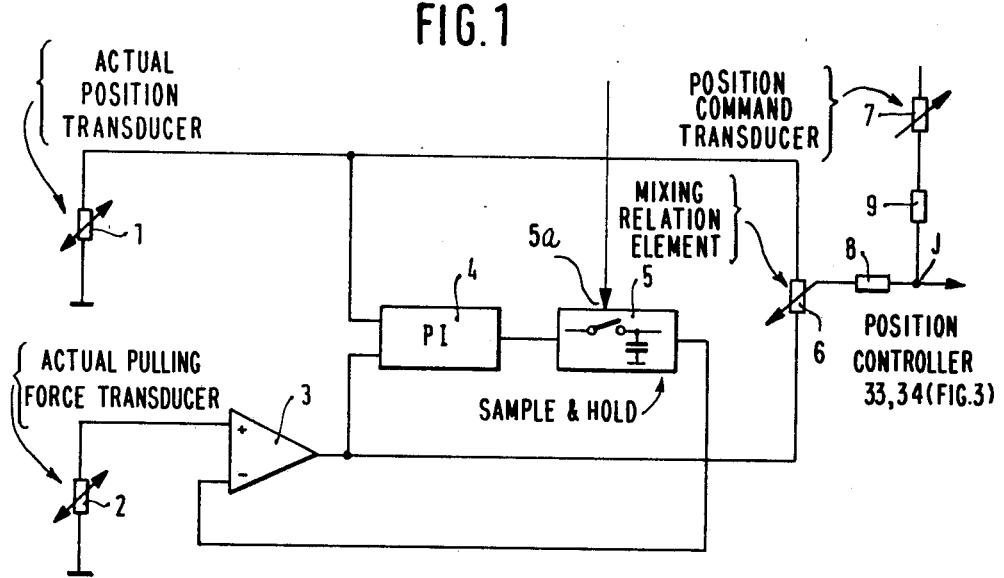
FIG. 1 is a schematic diagram of the system in accordance with the present invention.

A position transducer 1 (FIG. 1), for example secured to the lifting structure of a plough of a tractor, provides actual position output signals. A force transducer 2, secured to the pulling structure of the tractor, supplies output signals representative of the pulling force transferred between tractor and plough. The output signal of the transducer 2 is connected to the direct input of a differential amplifier 3. The indirect input of the differential amplifier 3 is derived from a sample-and-hold circuit 5. The output of the differential amplifier is connected to one input of a proportional-integral (PI) controller 4. The output of the differential amplifier 3 additionally is connected to a mixing positioner 6 shown, for example, as a potentiometer. The mixing positioner 6 is likewise connected to the output from the actual position transducer 1. The output signal of the position transducer 1 is connected to a second input of the PI controller 4 which, through the sample-and-hold circuit 5, is connected to the other input of comparator 3. The output of actual position transducer 1 is, additionally, connected to the second input of the mixing positioning element 6. The sample-and-hold circuit 5 is connected to the inverting input of the comparator 3, formed as a differential amplifier. The sample-and-hold circuit has a control input 5a which controls holding or storage of the signal being applied to the circuit 5.

Figure 3:
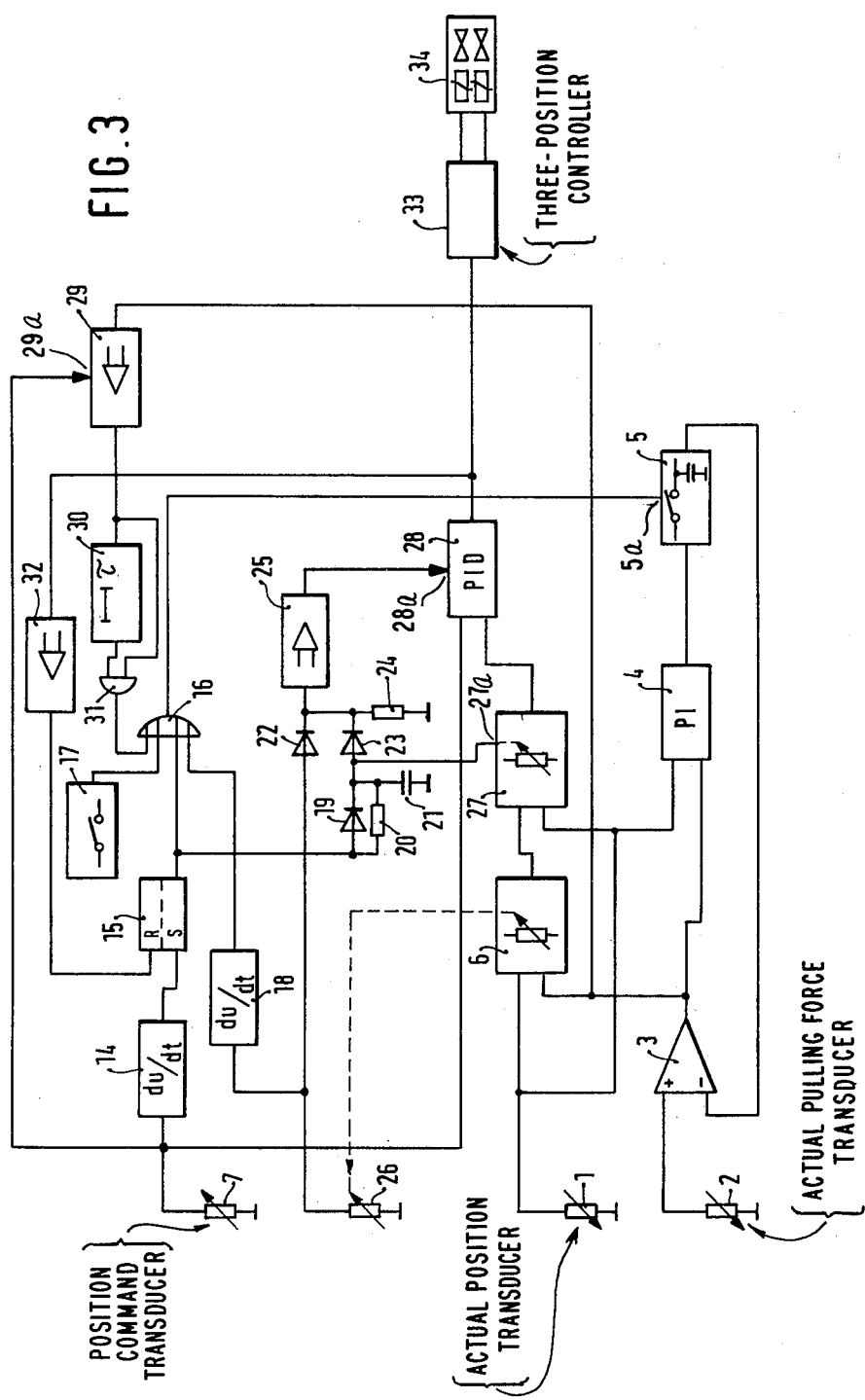
FIG. 3 is a detailed diagram showing another embodiment of the invention.

The mixing positioning element 6 is formed as a center tap or slider of a potentiometer, and connected over a resistor 8 to a position controller, such as a three-point controller 3 (FIG. 3) coupled to valve 34. Controller 33, for example, is a three-position controller, for example of the "up-center hold-down" type, controlling suitable hydraulic valves. A position command transducer 7 is provided, coupled over a resistor 9 to the output of the resistor 8, to provide position control signals. The signals provided by the combination of the resistors 8, 9, in proper polarity, control the three-position control units 33, 34 (FIG. 3).

The position command transducer 7 permits the operator to set an initial position of the plough with respect to ground level, for example by relating the depth of penetration of the plough to average level of the wheels of the tractor, and/or the plough itself. The plough is lowered until the signal from the position transducer 1 corresponds to the predetermined command signal. To take into consideration different consistencies and characteristics of the soil in which the plough operates, the mixing positioner 6 is provided, so that the control of the position will also include a function of soil condition, and to permit mixing-in of a signal proportional to pulling force together with the positioning signal. Of course, the pulling force signal, in turn, is related to soil condition, for example whether the soil is dense, loose, wet, i.e. slippery, and the like.

Let it be assumed that the mixing position element 6 has been set to a predetermined level, determined by experience. If, under these conditions, the setting of element 6 is changed, the voltage applied to the resistance 8, and relating force and position, would change, and thus cause the controllers 33, 34 (FIG. 3) to change the position of the towed implement, in the example the plough. The change in position which will result due to changing of the mixing position of the element 6 would have to be compensated for by a change in the position command transducer 7. Such a change would not occur, however, if the position signal from position transducer 1 and the force signal from force transducer 2 would be equal at a predetermined instant of time since, then, the two connecting points of the mixing position element 6 would have the same voltage applied thereto—assuming the aforementioned balanced condition—so that even shift of the potentiometer of the mixing position transducer 6 will not cause any change at the output or tap point of the element 6. Thus, changing the position of the tap point of potentiometer 6 would not have any influence on the position controllers 33, 34 connected to junction J forming the connection of resistors 8, 9. In principle, it is irrelevant if the actual position signal or the actual pulling force signal is normalized with respect to the other, such that the signals are equal. The example selected illustrates standardization or normalization of the actual pulling force signal with respect to the actual position signal.

The voltage derived from the differential amplifier 3 is compared in the PI controller 4 with the voltage of the actual position transducer 4. A PI controller is preferred and desirable, since, thereby, background noise signals which are usually present in the force signal can be compensated, and their effect eliminated. This background noise in the force signal is present due to the course consistency of soil through which agricultural implements work and unavoidable tipping and oscillation of the pulled implement with respect to the pulling implement, particularly small tipping-forward of the implement, and compensatory rise. The output signal of the PI controller 4 then is transferred at a predetermined time instant to the memory 5 formed by the sample-and-hold circuit. This can be done in fixed time intervals; it is, however, preferred to automatically transfer the value to memory, that is, to effect storage automatically. Such transfer can be done in cyclically recurring time intervals.

The values stored within the memory 5 will be the difference between the force signal and the position signal. Upon application of this difference to the inverting input of differential amplifier 3, the output of the differential amplifier 3 will have a value thereat which corresponds exactly to the actual position signal. Thus, since the voltages applied at both sides of the potentiometer 6 will be the same, changing the mixing value of the two parameters—position and force—will not cause a shift in position, that is, an output signal being applied at junction J, assuming the position signal set in transducer 7 to remain constant.

Figure 2:
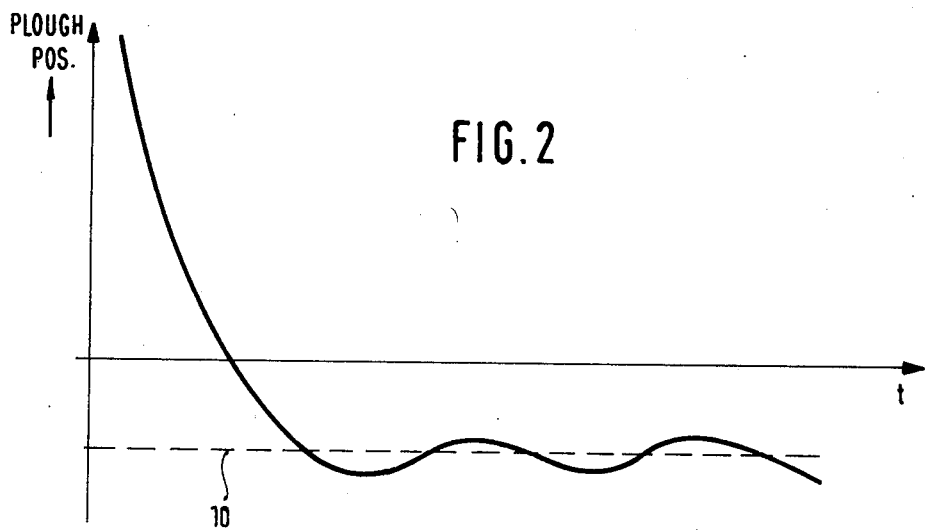
FIG. 2 is a graph illustrating the operation of the mixing control unit.

FIG. 2 illustrates the control mode: The ordinate represents the position of the pulled implement, the abscissa time. The position transducer 7 is set to a desired level 10, below ground level, as schematically illustrated by the broken line below the abscissa t.

Operation, with reference to FIG. 2: The ordinate of FIG. 2 shows the position of the implement being pulled by the tractor, and is placed below the abscissa t representing time axis, to schematically illustrate penetration into the soil. Initial dropping of the plough 7 will be explained below. The position transducer 7 is controlled by the operator to provide a command or desired level 10. Various settings of the positioning element 6 now are possible. First, let it be assumed that the positioning element 6 is so set that the positioning signal of the position transducer 1 is dominant. The desired level 10 would be held constant at all times; however, if the soil would change from a light, loose soil to a heavy one, for example if the tractor pulls the plough from an elevated position where winds have been drying the soil to a lower position, where moisture had accumulated, the tractor may be excessively strained, and could no longer provide the required pulling force, thus stalling. Let it be assumed, next, that the operator sets the mixing positioning element 6 to also consider force exerted by the tractor. Let it next be assumed that the force signal is made to be dominant. Upon change in force on transducer 2, the position of the plough would no longer be maintained constant; it would change with change in pulling force, that is, as pulling force increases, the depth would decrease, and vice versa. The depth of the furrow would thus deviate from the commanded setting.

Upon change of force, as sensed by the force transducer 2, the position cannot be held constant at all times anymore, but will change in accordance with the position of the mixing element 6. The depth of the furrow oscillates or hunts about the desired or commanded depth 10. The force signal will, however, have a d-c component applied thereto, mixed therein and derived from the memory formed by the sample-and-hold circuit 5. Thus, changing of the mixing element 6 in direction to the force transducer causes changing in force due to the pulled implement to be lessened, until such changes are effectively equalized or eliminated, if the mixing element 6 is so set that only the normalized signal from the force transducer 2 will reach the output thereof, that is, connected by resistor 8 to junction J. In that case, the position itself would no longer have any effect.

FIG. 1 illustrates an embodiment in which the force correction value is formed in a control loop which includes the differential amplifier 3, the PI controller 4, and the memory 5. The actual position signal derived from the actual position transducer 1 is utilized as a leading signal for the force signal. Normalization is obtained by setting the mixing value free from feedback due to change in other parameters, so that no correction of position, that is, correction by manual intervention in the position command transducer 7 is necessary. Additionally, the force measuring device, including the differential amplifier 3, need be controlled and adjusted only roughly since correction is effected electronically. This decreases calibration and maintenance time, since aging and temperature problems within the control loop are automatically compensated and no longer affect the position controllers 33, 34 (FIG. 3).

FIG. 3 shows the circuit with automatic standardization or normalization in detail. Actual force transducer 2, as in FIG. 1, has its output connected to the direct input of differential amplifier 3. The output of differential amplifier 3 is connected to one input of a PI controller 4. The further input of the PI controller 4 is connected to the actual position transducer 1. The output of the PI controller 4 is connected to a memory 5 which, again, is formed as a sample-and-hold circuit. The output of memory 5 is connected to the inverting input of the differential amplifier 3. The output of differential amplifier 3 and the output of the position transducer 1 are connected to the mixing relation element 6. The mixing relation element 6 is mechanically coupled to a further potentiometer 26. The output of the mixing relation element 6 is connected to the input of a second mixer 27, having a further input connected to the position transducer 1. The mixer 27, for example, is also a potentiometer, the tapped position of which can be electronically changed. The output of the second mixer 27 is connected to the input of a proportional-integral-differential (PID) controller 28. The control function of the PID controller 28 can be changed in dependence on a control voltage applied at a terminal 28a. The other input of the PID controller 28 is connected to the position command transducer 7. The output of the PID controller 28 is connected to the three-position controller 33. Three-position controller 33 has a center or dead range, which does not provide an output signal; in dependence as to whether the dead range is exceeded, a direction-dependent signal is applied, controlling hydraulic valves of a hydraulic positioner 34, either in UP or DOWN position. In the most simple case, two separately connected hydraulic valves can be used. In the dead center or OFF range of the three-position controller, both hydraulic valves are closed, thus maintaining hydraulic pressure at a certain position level. Upon exceeding the center or OFF range, the one or the other one of the hydraulic valves 34 are operated in dependence on whether raising or lowering of the plough is desired.

Potentiometer 26, coupled to the mixing relation element 6, is connected to a differentiator 18 and then to an OR-gate 16. Additionally, the output of potentiometer 16 is connected over a diode 22 to a comparator 25, the output of which controls mode or function switching of the PID controller 28. The output of the position command transducer 7 is additionally connected over a differentiator 14 with the SET input of a flip-flop (FF) 15. The output of FF 15 controls a further input of the OR-gate 16 and, additionally, is connected through a parallel network including a diode 19 and a resistor 20, which are connected over a capacitor 21 to ground or chassis on the one hand and, on the other, to the control input 27a which controls the position of the potentiometer of the second mixer 27. A diode 23 additionally is connected to the control input 27 and the output thereof is also connected to the output of diode 22 and to the comparator 25. A further input of the OR-gate 16 is connected to a manual switch 17. Normalization of the signals derived from the actual pulling force transducer in the differential amplifier 3, and mixing with the actual position transducer signals, is identical to the operation described in connection with FIG. 1. FIG. 3, additionally, includes transfer into the memory, which is automatically effected and is generated by a pulse from OR-gate 16, applied to the STORE terminal 5a of memory 5.

The output of the differential amplifier 3 is connected, in addition to the connections explained in FIG. 1, to a window comparator formed by a comparator 29. The control input 29a of window comparator 29 is connected to the output of the position command transducer 7. The output of the controllable window comparator 29 is connected through a delay circuit 30 to an AND-gate 31 and, additionally, directly to an input of the AND-gate 31. The output of the AND-gate 31 is connected to a further input of the OR-gate 16. The output of the OR-gate 16, as noted, is connected to the control input of the memory 5. The output of the PID controller 28 is likewise connected to a window comparator 32, the output of which is connected to the reset input of the FF 15.

Operation, FIG. 3: Transfer of stored values into the memory 5 are automated, and effected by a pulse from OR-gate 16. Upon operation of the position command transducer 7, differentiator 14 will respond and thus recognize that the commanded position, which also is applied to the PID controller 18, has changed. This causes the FF 15 to be SET, and the pulse is transferred through OR-gate 16 to the input 5a of memory 5. Memory 5, thus, can receive the value from the output of the PI controller 4. Simultaneously with setting of FF 15, diode 19 charges capacitor 21. Diodes 22, 23 together with the resistor 24 form a peak evaluation circuit. Only the highest value which is applied to the diodes 22, 23 will be applied to the comparator 25. If the FF 15 is set, then this will be the value on diode 23. This value is used to control the setting of the potentiometer of the second mixer 27 as well. Thus, if FF 15 is set, a high value is applied to the control input of the second mixer 27, which means that the potentiometer of mixer 27 is so controlled that only the position signal from actual position transducer 1 can be applied to the PID controller 28. By passing the signal through a peak detection circuit, comparator 25 will receive the actual output level of FF 15. The output of comparator 25 so controls the operating mode of the PID controller 28 that it is only slightly integrating, that is, has only a low integration value; effectively, it operates as a proportional-differential (PD) controller. Automatically, therefore, one obtains this result: Upon change of the position transducer 7, force or power influences no longer have any effect, and the controlled implement, that is, in the example selected, the plough, will receive its desired depth or position due to the PD structure of the PID controller 28 as rapidly as possible. Thus, from whatever its previous position was, the plough is rapidly brought to its commanded position 10, as illustrated in the initial portions of FIG. 2.

If the control deviation at the output of the PID controller is approximately zero, window comparator 32 will recognize this state, and provide, at its output, a reset pulse to the FF 15. Consequently, OR-gate 16 switches back to non-conductive state and the value last available on the PI controller 4 will be the value which will be stored in the memory 5. Resetting of FF 15 slowly discharges the capacitor 21 through resistor 20. As the capacitor discharges, the potentiometer of the second mixer 27 is slowly repositioned until, with the capacitor 21 discharged, it will reach a position so that only the signal from the mixing relation element 6 is transferred via the potentiometer of the second mixer 27 to the input of the PID controller 28.

This slow change-over or transitional mode causes gradual change-over from a pure position control to mixed control, rather than abrupt change-over. Thus, transition is carried out gradually in accordance with a transfer function with respect to time. This transitional function can be constructed in accordance with any desired relationship, in accordance with simple or complex design, and can be readily determined by the position-electrical characteristics of the potentiometer 27. In a preferred form, an exponential function is used, which results in a particularly simple circuit. Thus, the potentiometer 27 will have an exponential position-resistance relationship.

After discharge of capacitor 21, the value of the mixing relation element 6 is directly connected to the PID controller 28. After some time, the voltage value on diode will exceed the voltage value on diode 23. This causes switch-over or transfer of comparator 25, thereby changing the operating mode or function of the PID controller 28. The voltage on the diode 22 depends on the value at which potentiometer 26 is set, which is operated in conjunction with the mixing relation element potentiometer 6, for example by being ganged thereto.

The PID controller 28 is particularly desirably so constructed that, in dependence on additional introduction of force components, its integrating function increases. Upon switch-over of comparator 25, the integrating portion of the PID controller 28 is increased if a predetermined proportion of force signal is connected through the mixing controller 6 to the PID controller 28. The reason therefor is the increased noise component of the output signal at the output of the actual pulling force transducer 2, transferred through the differential amplifier 3. The comparator 25, thus, preferably is so adjusted that it does not switch over when the mixing relation potentiometer 6 is in a position in which the position signal from the actual position transducer 1 is dominant.

It is possible to replace comparator 25 by an amplifier which continuously changes the integration time constant of the PID controller 28. The actual control function or transfer function of the PID controller 28 can thus be matched to various design requirements.

The differentiator 18 provides a pulse when the mixing positioning element 6 changes. This pulse is transferred through the OR-gate 16 to result in resetting of the memory 5 to a new standardized or normalization value. It is not entirely necessary to reset the memory 5 at that time, so the differentiator 18 and its connection to the OR-gate 16 are not strictly necessary. Yet, providing the differentiator 18 is a simple and inexpensive way of compensating for temperature drifts and changes in component values due to aging.

Switch 17, which can be controlled by the operator, permits operator supervision of recalibration or re-standardization of the system by manual intervention.

It is possible that, due to forces occurring in operation of the tractor-implement combination, and depending on the position of the mixing relation potentiometer 6, the position of the plough is so changed that the PID controller 28 reaches the limits of its control range. In that case, a new calibration or standardization should be carried out. High forces are recognized by the window comparator 29. Since the output signal of differential amplifier 3 is normalized by the position signal, it is desirable that the limits of the window comparator 29 are matched to the respective standardization or normalization. This can easily be done by applying the position command signal as an input to the window comparator 29, thus determining the limits or operating range of the window comparator 29 in dependence on the position command transferred by the position command transducer 7. The delay circuit 30 and the AND-gate 31 are used to filter out sudden jumps in power requirements. Such sudden jumps may be caused, for example, by rocks or stones in the soil; such sudden jumps should not lead to recalibration or new normalization of the system. Normalization of the system, that is, acceptance of a new stored value in the memory 5 under command of the OR-gate 16, should be carried out only when the force signal is present for a period of time which exceeds the delay time of the delay element 30 after having been applied to the window comparator 29. Only then will a new normalization be carried out.

The force control range, dependent on operating speed of the tractor and slippage, and on soil resistance, may be set to desired conditions or ranges within an overall operating range. The control width or range of the PID controller 28 will be selected in accordance with the particular implement being pulled by a tractor. The circuit of FIG. 3 permits adjusting the mixing value or, rather, the mixing relation, by the potentiometer 6 without return effects on the position of the implement, so that correction of the position command by resetting the position command transducer is not necessary. Additionally, the measured range of the actual pulling force is automatically determined. Any command to drop or lower the plough will be maintained with respect to the previously desired or commanded depth, in spite of possible differences in soil composition. The dropping of the plough initially results only in a position controlling, since the force operating point is newly set thereafter by the normalization circuit. Initially, only, positioning control is effected, so that the desired depth is rapidly reached; thereafter, the system changes automatically to mixed depth—and —force controlled mode of operation to prevent overloading of the tractor or undesired operating conditions thereof.

Using a differential amplifier 3 or equivalent circuit has the advantage that the normalized actual pulling force transducer signal will be equal in level or value to the actual position signal. Thus, change in the relative effects of the actual pulling force signal and the actual position signal will not cause any control operation of the plough lifting controllers 33, 34 even if the mixing ratio or relationship of the position signal and the pulling force signal is changed. Use of the PI controller 4 eliminates background noise, and the memory, enabled from time to time whenever changes occur, for example upon manual lowering of the plough, reaching of a certain position, and the like, permits storage of then pertaining normalized signals for continued processing, and thus maintenance of the commanded plough position. Use of a PI controller effectively eliminates noise signals which are unavoidable in the pulling force signal.

The memory, in accordance with an advantageous feature of the invention, is activated each time for storing a newly normalized value upon change of the position command transducer, preferably, for example, by differentiating signals from the position command transducer. This recalibration or renormalization insures that any change in the position command transducer, resulting in a changed position command signal, also will reset or recalibrate the normalized pulling force signal, so that the mixing relation setting element 6 will continue to remain balanced, and will not receive an unbalancing signal.

Changing the control mode or transfer function of the controller in dependence on the position of the mixing relation element 6 permits optimum control of the overall control loop or loops since different control effects can be obtained in dependence on the relative proportion of force or position in the mixed signal controlling the position of the pulled implement.

The peak evaluation circuit, formed by the diodes 22, 23, in combination with the resistor 24 and the comparator 25, provides a priority circuit for the position command transducer 7 upon change of setting of the position command transducer. The priority circuit applies a signal to the control system which is derived essentially only from the actual position transducer 1 if the position command transducer 7 is operated. Consequently, upon a change of commanded position, the actual position is rapidly reached, without considering external effects, such as effects due to pulling power, soil composition, or the like. During that period of time, the mixer 6 is effectively bridged or rendered inoperative—see connection from actual position transducer 1 to the input of potentiometer 27. This priority of position is not maintained for a constant period of time, however; rather, deviation of actual position from commanded position is determined and, when the deviation has reached a low limit, the priority circuit is again disconnected. This gradual change-over or transition is effected by the circuit 19, 20, 21, in combination with the diodes 22, 23.

The different control modes or transfer functions obtainable by controlling transfer function of PID controller 28, through its input 28a, permits effective gradual transition and transfer of signals from the mixing relation potentiometer 6. Thus, the gradual change-over from priority of position control, together with the change in the integrating function of the PID controller 28, results in gradual and soft transfer of operation from purely position command control to mixed force—and—position control, and consequently in effective operation of the implement.

Various changes and modifications may be made within the scope of the inventive concept.

We claim:

1. Control system for a pulled load from a traction drive in which the position of the load with respect to ground level is subject to a command control (7), particularly for agricultural trailed apparatus pulled by a tractor, having a position command element (7) providing a command position signal;

a position transducer (1) providing an actual position signal;

a force transducer (2) measuring the pulling force and providing an actual force signal;

a controlled mixer (6) connected to and controlled by the actual position signal and the actual force signal and providing a combined mixed signal;

and a control means (33, 34) coupled to the pulled load and responsive to the commanded position signal and combined signal to position the pulled load with respect to ground level;

and comprising, in accordance with the invention, means (3, 4, 5) for normalizing one of said actual signals with respect to another one of the actual signals, said so normalized one signal and the other one of the signals being connected to the controlled mixer to eliminate reaction on the mixing ratio or mixing relationship effected by the controlled mixer upon relative change of said one actual signal with respect to the other, and hence change of the actual position of the pulled load independently of change of the setting of the positioning command element (7).

2. System according to claim 1, wherein said one actual signal comprises the actual force signal, and said normalizing means (3, 4, 5) normalize the actual force signal with respect to the level of the actual positioning signal.

3. System according to claim 1, wherein the normalizing means includes a memory (5) storing a value representative of a correction factor to be applied to the actual signal to be normalized;

and means (5a, 16) enabling said memory in dependence on predetermined events occurring in the operation of the system including at least one of:

change of mixing ratio or relationship within said controlled mixer;

change of position command resulting in a changed command position signal;

manual command of storage;

sensing of an actual force signal in excess of a predetermined level or range.

4. System according to claim 2, wherein the normalizing means includes a memory (5) storing a value representative of a correction factor to be applied to the force signal to be normalized;

and means (5a, 16) for enabling said memory in dependence on predetermined events occurring in the operation of the system including at least one of:

change of mixing ratio or relationship within said controlled mixer;

change of position command resulting in a changed command position signal;

manual command of storage;

sensing of an actual force signal in excess of a predetermined level or range.

5. System according to claim 2, wherein the normalizing means comprises
a differential amplifier (3) having one input coupled to the force transducer means and receiving said actual force signal;
and a memory (5) having its output connected to the second input of the differential amplifier and storing the difference between the actual position signal derived from the position transducer and the previously normalized actual force signal derived from the force transducer (2).

6. System according to claim 5, wherein the normalizing means further includes
a proportional-integral (PI) controller (4) connected to and receiving the actual position signal and the output from said differential amplifier (3), said PI controller (4) being connected to the memory (5).

7. System according to claim 6, wherein the memory (5) comprises a sample-and-hold element;
and wherein the sampling instant is determined in dependence on predetermined events occurring in the operation of the system.

8. System according to claim 7, wherein said predetermined event comprises a change in position of the positioning command element.

9. System according to claim 7, wherein said predetermined event comprises excursion of the normalized force signal beyond a predetermined range.

10. System according to claim 9, including means (29) for providing a limited level range, the limits of which are adjustable, coupled to and connected to receive the normalized force signal;
the limits of said range being determined in dependence on the position of the position command element (7).

11. System according to claim 10, wherein said range providing means comprises a window comparator (29) having a control terminal (29a) setting the window or range thereof, the control terminal (29a) being coupled to the position command transducer (7).

12. System according to claim 9, further including a time recognition circuit and suppressing communication of short-time excursions of the normalized force signal to said memory.

13. System according to claim 7, wherein said event comprises manual switching.

14. System according to claim 7, wherein said event comprises change of the controlled mixer (6) by changing the relative ratio or contribution of the actual position signal and the normalized force signal to the combined signal.

15. System according to claim 2, further including a function generator (28) in circuit with the control means (33, 34), said function generator modifying the control operation of the load, as controlled by the command position signal and the combined signal, with respect to time, in dependence on at least one predetermined operating condition occurring within the system including at least one of:
the relative mixing position of the controlled mixer with respect to limiting positions thereof;
change in the setting of the position command element (7).

16. System according to claim 15, including a priority circuit (19, 20, 21, 27) coupled to the position command element (7) and to the function generator (28) to modify the transfer function of the function generator upon change of the positioning command element to transmit to the control means command data essentially containing only signals in dependence on position of the load.

17. System according to claim 16, further including means sensing a level of the command position signal and the combined signal below a predetermined level, and connected to inhibit the priority circuit (19, 20, 21, 27).

18. System according to claim 17, wherein the priority circuit includes a peak detector circuit (22, 23) and a timing circuit (19, 20, 21) coupled to the positioning command element and gradually reducing the effect of the positioning command signal on the function generator (28).

19. System according to claim 16, further including a second function generating circuit (19, 20, 21) forming part of the priority circuit, and connected to the controlled mixer (6), said second function generating circuit enhancing the effect of the controlled mixer on the signal formed by the command position signal and the combined signal after a predetermined time has elapsed subsequent to a change in the positioning command element.

20. System according to claim 1 or 2, wherein said controlled mixer comprises
a two-input element (6) which forms a current path between the inputs,
and an output element tapped between said inputs;
one actual signal being applied to one of the inputs and the normalized signal being applied to the other one of the inputs, the normalization of the normalized signal placing the inputs to said elements in balance and permitting relative change of the signals applied to the inputs without consequent reaction on the positioning of the load with respect to ground level.

21. Method of controlling operation of an agricultural implement pulled by a traction drive, in which the position of the implement with respect to ground level is subject to a command control, particularly for an implement trailed by a tractor, for use in a control system having
a positioning command element (7) providing a command position signal;
a positioning transducer (1) providing an actual position signal;
a force transducer (2) measuring the pulling force of the tractor and providing an actual force signal;
a controlled mixer (6) connected to and controlled by the actual position signal and the actual force signal, and providing a combined signal;
and a control means (33, 34) coupled to the pulled load responsive to the command position signal and to the combined signal to position the pulled load, comprising the steps of
normalizing the force signal with respect to the position signal to have an essentially equal level, said signals of equal level being connected to the controlled mixer to eliminate reaction on the mixing ratio or mixing relationship to the actual force signal and the actual positioning signal upon relative change of one of said signals with respect to the other, and hence change of the actual position of the pulled load without any change in the setting of the positioning command element.

22. Method according to claim 21, including the step of storing the difference between the actual force signal and the normalized force signal;
and up-dating said stored difference in dependence on the occurrence, during operation of the system, of at least one of predetermined events;
change of mixing ratio or relationship within said controlled mixer;
change of position command resulting in a changed command position signal;
manual command of storage;
sensing of an actual force signal in excess of a predetermined level or range.

23. Method according to claim 21, including the step of modifying the transfer function effect on the control means (33, 34) under control of the command position signal and the combined signal, with respect to time, upon occurrence of at least one of:
change in the position of the controlled mixer;
change in the position of the positioning command element.

* * * * *